United States Patent
Noheji (10) Patent No.: US 7,224,899 B2
(45) Date of Patent: May 29, 2007

(54) OPTICAL TRANSMISSION SYSTEM

(75) Inventor: Kiyotoshi Noheji, Hokkaido (JP)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 10/614,791

(22) Filed: Jul. 9, 2003

(65) Prior Publication Data

US 2004/0028407 A1    Feb. 12, 2004

(30) Foreign Application Priority Data

Jul. 17, 2002    (JP) .............................. 2002-207776

(51) Int. Cl.
*H04B 10/08*    (2006.01)
*H04B 10/20*    (2006.01)
*H04B 10/02*    (2006.01)
*H04J 14/02*    (2006.01)

(52) U.S. Cl. ............................ 398/33; 398/37; 398/38; 398/59; 398/94; 398/177

(58) Field of Classification Search ................. 398/25, 398/31–34, 37, 38, 59, 94, 95, 177
See application file for complete search history.

(56) References Cited

U.S. PATENT DOCUMENTS 6,456,406 B1 * 9/2002 Arecco et al. ................ 398/59

2001/0050790 A1 * 12/2001 Graves et al. .............. 359/110

FOREIGN PATENT DOCUMENTS

JP    10-051397 A    2/1998

* cited by examiner

*Primary Examiner*—Dalzid Singh
(74) *Attorney, Agent, or Firm*—Staas & Halsey LLP (57) ABSTRACT

Disclosed herein is a system including a closed loop topology using an optical fiber applicable to WDM signal light obtained by wavelength division multiplexing a plurality of optical signals, and a plurality of nodes arranged along the closed loop topology, each node including an optical amplifier. Each node further includes a first unit for controlling the optical amplifier so that the output from the optical amplifier becomes constant, according to the number of channels of WDM signal light received from the node immediately upstream of the corresponding node, and a second unit for interrupting the optical signals other than one or more optical signals added to the corresponding node until the control by the first unit is converged. With this configuration, each node can be easily started.

31 Claims, 10 Drawing Sheets

OPTICAL TRANSMISSION SYSTEM

BACKGROUND OF THE INVENTION

1. Field of the Invention

The present invention relates to an optical transmission system applicable to a closed loop topology.

2. Description of the Related Art

In recent years, a manufacturing technique and using technique for a low-loss (e.g., 0.2 dB/km) silica optical fiber have been established, and an optical communication system using the optical fiber as a transmission line has been put to practical use. Further, to compensate for losses in the optical fiber and thereby allow long-haul transmission, the use of an optical amplifier for amplifying an optical signal or signal light has been put to practical use.

An optical amplifier known in the art includes an optical amplifying medium to which signal light to be amplified is supplied and means for pumping the optical amplifying medium so that the optical amplifying medium provides a gain band including the wavelength of the signal light.

For example, an erbium doped fiber amplifier (EDFA) has already been developed to amplify signal light in a 1.55 μm band where the loss in a silica fiber is low. The EDFA includes an erbium doped fiber (EDF) as the optical amplifying medium and a pumping source for supplying pump light having a predetermined wavelength to the EDF. By preliminarily setting the wavelength of the pump light within a 0.98 μm band or a 1.48 μm band, a gain band including a wavelength of 1.55 μm can be obtained.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. At a receiving end, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

By using an optical amplifier as a linear repeater, the number of parts in the repeater can be greatly reduced as compared with the case of using a conventional regenerative repeater, thereby ensuring reliability and allowing a substantial cost reduction.

The introduction of WDM into a trunk line has been increasingly made in recent years, and as a network topology adopting WDM a ring configuration, or closed loop topology is generally used. However, the introduction of WDM into a medium-distance network (metropolitan area network) such as in urban areas delays in response to an increase in transmission speed in the trunk line, and an optical communication system by a single wavelength or an electrical communication system by a metal cable is yet mainly in use. Accordingly, the demand for the introduction of WDM into the metropolitan area network is increasing with the widespread use of the Internet and the trend toward broadband communication.

The metropolitan area network is usually configured by arranging a plurality of nodes along the closed loop topology. The reason for such a configuration is to provide a stable communication environment even when a failure such as a line break occurs.

In general, each node connected to the closed loop topology performs adding/dropping of an arbitrary one or more optical signals by utilizing the feature of WDM. To this end, each node employs an optical switch or the like in many cases, so that an optical amplifier is included in each node to compensate for loss in the optical switch. The optical amplifier is so designed as to support a difference between the wavelength of each optical signal passing through the node and the wavelength of each optical signal to be added/dropped and a change in the number of channels. Further, automatic level control (ALC) for maintaining a required output at a constant level is also necessary to tolerate a deviation in transmission line loss.

In performing ALC in each node, it is necessary to preliminarily grasp the number of channels of WDM signal light input to the optical amplifier. Therefore, a supervisory signal including information on the number of channels of the WDM signal light is transmitted from the upstream node to the downstream node. However, at initially starting (cold starting) the system, the number of add/drop channels has not been determined, so that the information on the number of channels of the WDM signal light is not determined and each node cannot be started easily.

SUMMARY OF THE INVENTION

It is therefore an object of the present invention to provide an optical transmission system applicable to a closed loop topology in which each node can be easily started.

In accordance with an aspect of the present invention, there is provided an optical transmission system comprising a transmission line and a plurality of nodes arranged along said transmission line for adding and dropping one or more optical signals of WDM signal light; each of said nodes having an optical amplifier; said optical amplifier being controlled so that the output from said optical amplifier becomes constant, according to the number of channels of WDM signal light received from the node immediately upstream of the corresponding node; the optical signals received from said immediately upstream node being not output to the node immediately downstream of the corresponding node until the output from said optical amplifier is converged to a constant level.

In accordance with another aspect of the present invention, there is provided an optical transmission system comprising a transmission line and a plurality of nodes arranged along said transmission line for adding and dropping one or more optical signals of WDM signal light; each of said nodes having an optical amplifier; said optical amplifier being controlled so that the output from said optical amplifier becomes constant, according to the number of channels of WDM signal light received from the node immediately upstream of the corresponding node; the control of said optical amplifier being stopped when the number of channels of WDM signal light received is changed; the control of said optical amplifier being restarted after a predetermined time period has elapsed from the time of stopping the control of said optical amplifier.

In accordance with still another aspect of the present invention, there is provided an optical transmission system for adding and dropping one or more optical signals of WDM signal light, said optical transmission system being connected to an optical transmission line; said optical transmission system comprising a first optical amplifier for amplifying light from said optical transmission line; an optical demultiplexer for separating an output from said first optical amplifier into a plurality of optical signals having different wavelengths; an optical switch for inputting said optical signals from said optical demultiplexer and said one or more optical signals added to switch among through, add, and drop paths; a second optical amplifier for amplifying an output from said optical switch; and a control unit for controlling said first optical amplifier so that the output from said first optical amplifier becomes constant, according to the number of channels of WDM signal light transmitted by said optical transmission line, and interrupting said input optical signals other than said one or more optical signals added until the output from said first optical amplifier is converged to a constant level.

In accordance with still another aspect of the present invention, there is provided an optical transmission system for adding and dropping one or more optical signals of WDM signal light, said optical transmission system being connected to an optical transmission line; said optical transmission system comprising a first optical amplifier for amplifying light from said optical transmission line; an optical demultiplexer for separating an output from said first optical amplifier into a plurality of optical signals having different wavelengths; an optical switch for inputting said optical signals from said optical demultiplexer and said one or more optical signals added to switch among through, add, and drop paths; a second optical amplifier for amplifying an output from said optical switch; and a control unit for controlling said first optical amplifier so that the output from said first optical amplifier becomes constant, according to the number of channels of WDM signal light transmitted by said optical transmission line, stopping the control of said first optical amplifier when the number of channels of WDM signal light transmitted by said optical transmission line is changed, and restarting the control of said first optical amplifier after a predetermined time period has elapsed from the time of stopping the control of said first optical amplifier.

In accordance with a further aspect of the present invention, there is provided a system comprising a closed loop topology adapted to WDM signal light obtained by wavelength division multiplexing a plurality of optical signals; and a plurality of nodes arranged along said closed loop topology. Each of said nodes comprises a first optical amplifier for amplifying input signal light; an optical demultiplexer for separating signal light output from said first optical amplifier into a plurality of optical signals; an optical switch adapted to operate on a plurality of optical signals output from said optical demultiplexer; an optical multiplexer for wavelength division multiplexing a plurality of optical signals output from said optical switch; a second optical amplifier for amplifying signal light output from said optical multiplexer; and a control unit for controlling said first and second optical amplifiers. Said control unit comprises first means for transmitting the number of channels of WDM signal light to be output from the corresponding node to the node immediately downstream of the corresponding node; second means for controlling said first optical amplifier so that the output from said first optical amplifier becomes constant, according to the number of channels of WDM signal light received from the node immediately upstream of the corresponding node; and third means for controlling said optical switch so that the optical signals other than one or more optical signals added to the corresponding node are not output from the corresponding node until the control by said second means is converged.

In accordance with another aspect of the present invention, there is provided a system comprising a closed loop topology adapted to WDM signal light obtained by wavelength division multiplexing a plurality of optical signals; and a plurality of nodes arranged along said closed loop topology. Each of said nodes comprises a first optical amplifier for amplifying input signal light; an optical demultiplexer for separating signal light output from said first optical amplifier into a plurality of optical signals; an optical switch adapted to operate on a plurality of optical signals output from said optical demultiplexer; an optical multiplexer for wavelength division multiplexing a plurality of optical signals output from said optical switch; a second optical amplifier for amplifying signal light output from said optical multiplexer; and a control unit for controlling said first and second optical amplifiers. Said control unit comprises first means for transmitting the number of channels of WDM signal light to be output from the corresponding node to the node immediately downstream of the corresponding node; second means for controlling said first optical amplifier so that the output from said first optical amplifier becomes constant, according to the number of channels of WDM signal light received from the node immediately upstream of the corresponding node; third means for stopping the control by said second means when the number of channels received is changed; and fourth means for restarting the control by said second means after different time periods in said plurality of nodes have elapsed from the time of stopping by said third means.

In accordance with a still further aspect of the present invention, there is provided a method comprising the steps of providing a closed loop topology using an optical fiber applicable to WDM signal light obtained by wavelength division multiplexing a plurality of optical signals; providing a plurality of nodes each including an optical amplifier along said closed loop topology; and controlling each of said nodes. Said controlling step comprises a first step of controlling said optical amplifier so that the output from said optical amplifier becomes constant, according to the number of channels of WDM signal light received from the node immediately upstream of the corresponding node; and a second step of interrupting the optical signals other than one or more optical signals added to the corresponding node until the control by said first step is converged.

In accordance with another aspect of the present invention, there is provided a system comprising a closed loop topology using an optical fiber applicable to WDM signal light obtained by wavelength division multiplexing a plurality of optical signals; and a plurality of nodes arranged along said closed loop topology, each of said nodes including an optical amplifier. Each of said nodes comprises first means for controlling said optical amplifier so that the output from said optical amplifier becomes constant, according to the number of channels of WDM signal light received from the node immediately upstream of the corresponding node; and second means for interrupting the optical signals other than one or more optical signals added to the corresponding node until the control by said first means is converged.

In accordance with a still further aspect of the present invention, there is provided a method comprising the steps of providing a closed loop topology using an optical fiber applicable to WDM signal light obtained by wavelength division multiplexing a plurality of optical signals; providing a plurality of nodes each including an optical amplifier along said closed loop topology; and controlling each of said nodes. Said controlling step comprises a first step of controlling said optical amplifier so that the output from said optical amplifier becomes constant, according to the number of channels of WDM signal light received from the node immediately upstream of the corresponding node; a second step of stopping the control by said first step when the number of channels received is changed; and a third step of restarting the control by said first step after different time periods in said plurality of nodes have elapsed from the time of stopping by said second step.

In accordance with another aspect of the present invention, there is provided a system comprising a closed loop topology using an optical fiber applicable to WDM signal light obtained by wavelength division multiplexing a plurality of optical signals; and a plurality of nodes arranged along said closed loop topology, each of said nodes including an optical amplifier. Each of said nodes comprises first means for controlling said optical amplifier so that the output from said optical amplifier becomes constant, according to the number of channels of WDM signal light received from the node immediately upstream of the corresponding node; second means for stopping the control by said first means when the number of channels received is changed; and third means for restarting the control by said first means after different time periods in said plurality of nodes have elapsed from the time of stopping by said second means.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
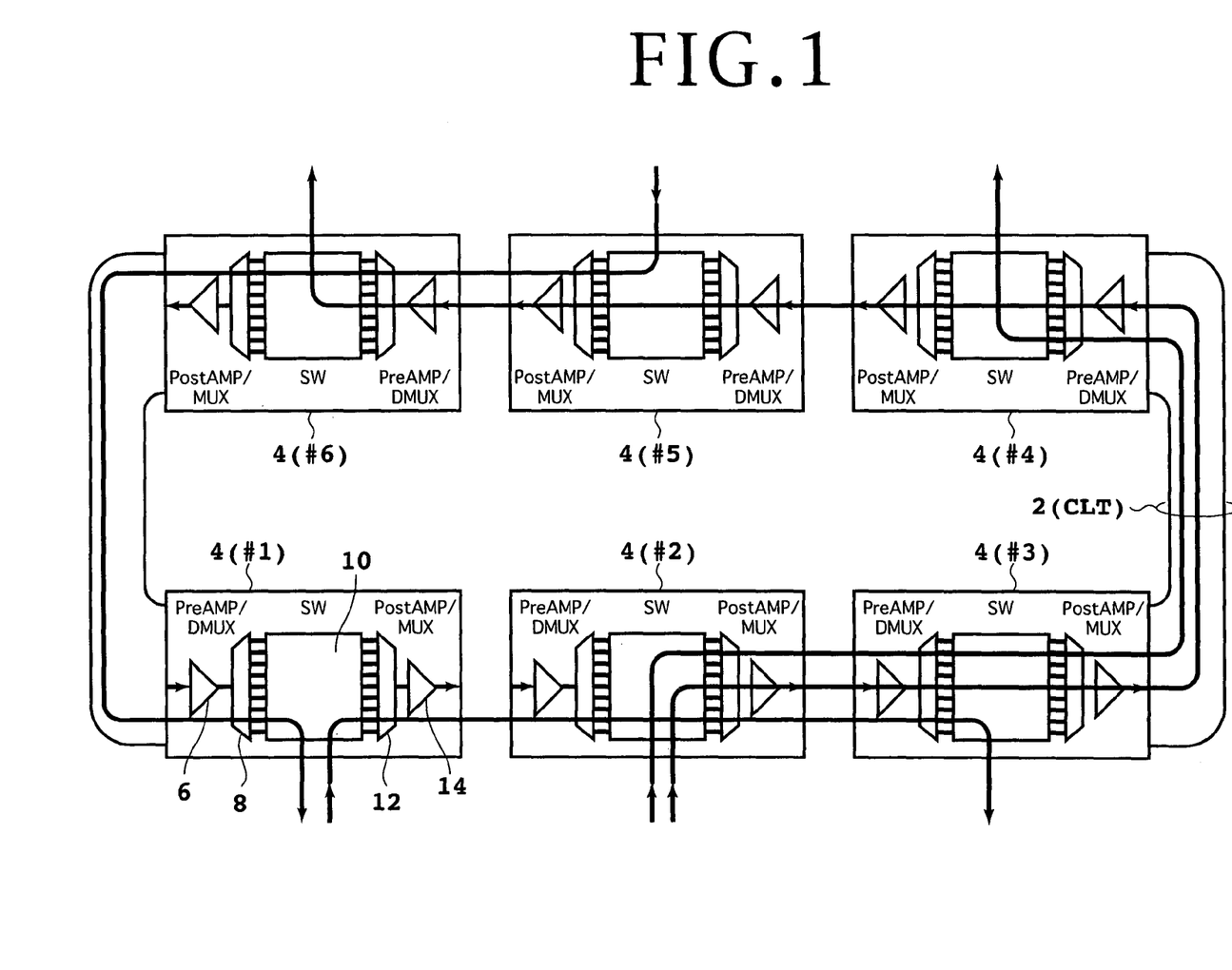
FIG. 1 is a block diagram showing a network by a closed loop topology to which the present invention is applicable.

Referring to FIG. 1, there is shown a network by a closed loop topology to which the present invention is applicable. This network includes a closed loop topology CLT provided by an optical fiber transmission line 2 and a plurality of nodes 4 arranged along the closed loop topology CLT. In FIG. 1, six nodes 4(#1) to 4(#6) are shown. This closed loop topology CLT is adapted to WDM signal light obtained by wavelength division multiplexing a plurality of optical signals.

Each node 4 includes a preamplifier 6 as a first optical amplifier for amplifying WDM signal light input from the optical fiber transmission line 2, an optical demultiplexer (DMUX) 8 for separating signal light output from the preamplifier 6 into a plurality of optical signals, an optical switch 10 operating on a plurality of optical signals output from the optical demultiplexer 8, an optical multiplexer (MUX) 12 for wavelength division multiplexing a plurality of optical signals output from the optical switch 10, and a postamplifier 14 as a second optical amplifier for amplifying signal light output from the optical multiplexer 12.

The preamplifier 6 is an optical amplifier for compensating for loss in the optical fiber transmission line 2, and has a function of controlling an output to a constant level by ALC (automatic level control) in addition to AGC (automatic gain control), so as to compensate for a deviation in transmission line loss.

The optical switch 10 selects a first path (Through) for passing an optical signal from an input port to an output port of the node 4, a second path (Drop) for dropping an optical signal from the node 4 to the outside of the node 4, and a third path (Add) for adding an optical signal from the outside of the node 4 to the node 4 according to the wavelengths of the input optical signals. The selection of these paths can be set individually in all the nodes 4, and an arbitrary optical signal can be transmitted from a specific one of the nodes 4 to another one according to the above setting.

The postamplifier 14 is an optical amplifier for compensating for loss in the node 4. In general, it is sufficient for the postamplifier 14 to perform AGC only for such loss compensation. However, the postamplifier 14 may also have a function of ALC as in the preamplifier 6.

Thus, it is sufficient that the postamplifier 14 has only a function of AGC because the optical signal level is usually compensated by the optical switch 10. However, ALC is indispensable in the preamplifier 6 for compensation of the deviation in the transmission line loss. In ALC, feedback control is performed according to the total optical output power from the preamplifier 6. Accordingly, information on the number of wavelength channels of the WDM signal light at this time is necessary. This will now be described more specifically.

Figure 2A:
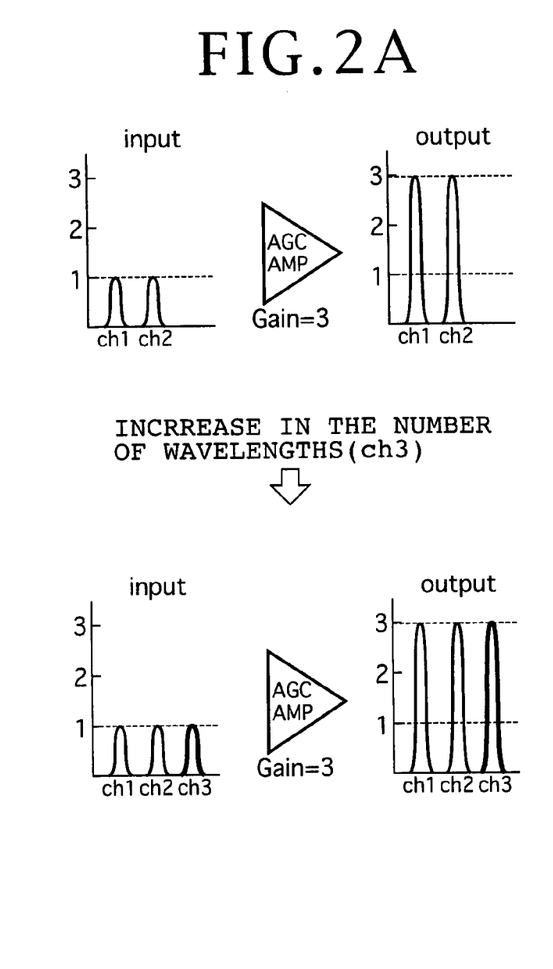
FIGS. 2A and 2B are diagrams for illustrating the cases where the number of channels of WDM signal light is changed during AGC and ALC, respectively.
Figure 2B:
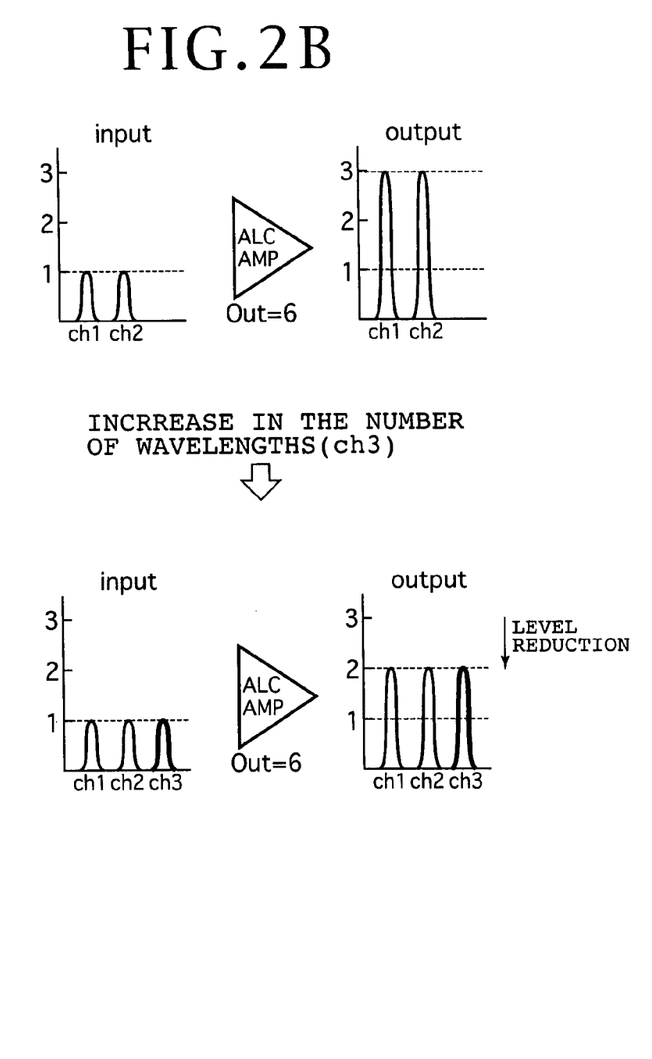

Referring to FIGS. 2A and 2B, there are shown the cases where the number of channels of the WDM signal light is changed during AGC and ALC, respectively. In the case of AGC with the gain being fixed to 3 as shown in FIG. 2A, the output level in each channel is unchanged regardless of an increase in the number of channels from 2 to 3. In contrast, in the case of ALC with the total output being fixed to 6 as shown in FIG. 2B, the output level in each channel is changed with an increase in the number of channels from 2 to 3.

Accordingly, a target output value in ALC is set according to the number of channels in performing ALC to maintain the total output at a constant level, and information on the number of channels is therefore necessary.

In the case of simultaneously starting all of the nodes 4(#1) to 4(#6) in the closed loop topology shown in FIG. 1, time is required until ALC in the preamplifier 6 in each node 4 becomes stable. While ALC in the preamplifier 6 in each node 4 remains unconverged, the number of channels of the WDM signal light input into the preamplifier 6 is not determined to result in a problem that each node 4 is not well started. To cope with this problem, the following control is conventionally performed, for example.

As a first method, the control not accompanied by ALC is performed. That is, an optical amplifier for performing only AGC giving a constant gain is used to thereby comply with the limitation to the closed loop topology. In this method, however, the deviation in transmission line loss is not tolerable, so that the support (local adjustment) by a serviceman is required at initially starting each node 4.

As a second method, the closed loop topology is modified into an open ring configuration at the time of starting each node 4. That is, at the initial start, a part of the closed loop topology is cut or a specific one of the nodes 4 is not started to thereby configure an open ring network topology, thereby allowing the determination of input power (information on the number of channels) to an optical amplifier for performing ALC. Also in this method, however, the specific node must be set at the initial start, so that the support by a serviceman is required.

Figure 3:
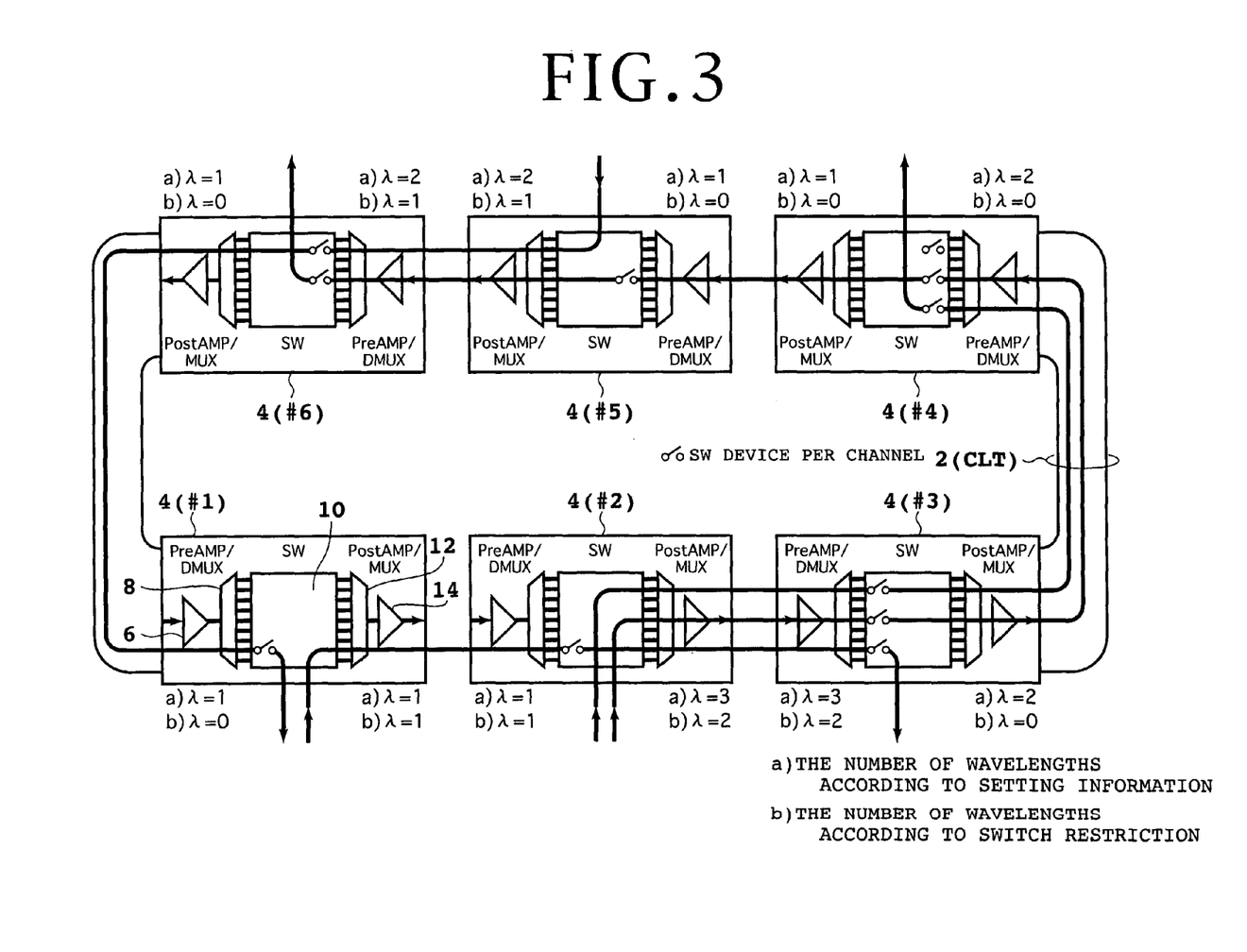
FIG. 3 is a block diagram showing a first preferred embodiment of the system according to the present invention.

FIG. 3 is a block diagram showing a first preferred embodiment of the system according to the present invention. For example, the optical switch 10 in each node 4 operates in the following manner. At the node 4(#1), an optical signal of one channel is dropped and an optical signal of one channel is added. At the node 4(#2), optical signals of two channels are added. At the node 4(#3), an optical signal of one channel is dropped. At the node 4(#4), an optical signal of one channel is dropped. At the node 4(#5), an optical signal of one channel is added. At the node 4(#6), an optical signal of one channel is dropped.

This preferred embodiment is characterized in that the optical switch 10 in each node 4 can cut off the optical paths so that only the optical signal added is supplied to the postamplifier 14.

More specifically, a switch function shown by a switch symbol in FIG. 3 is provided inside the optical switch 10 in each node 4. This switch function has an on-state (pass-through state) in a normal operating condition of the system, while having an off-state (cutoff state) during a predetermined time period at the initial start of the system.

In relation to the above example of the add/drop condition and the operation of the optical switch 10 in each node 4, the number of wavelengths (the number of channels) at the input and output of each node 4 is as follows:

At the input of the node 4(#1), the number of wavelengths according to setting information is 1, and the number of wavelengths according to switch restriction is 0. At the output of the node 4(#1), the number of wavelengths according to setting information is 1, and the number of wavelengths according to switch restriction is 1. At the input of the node 4(#2), the number of wavelengths according to setting information is 1, and the number of wavelengths according to switch restriction is 1. At the output of the node 4(#2), the number of wavelengths according to setting information is 3, and the number of wavelengths according to switch restriction is 2. At the input of the node 4(#3), the number of wavelengths according to setting information is 3, and the number of wavelengths according to switch restriction is 2. At the output of the node 4(#3), the number of wavelengths according to setting information is 2, and the number of wavelengths according to switch restriction is 0. At the input of the node 4(#4), the number of wavelengths according to setting information is 2, and the number of wavelengths according to switch restriction is 0. At the output of the node 4(#4), the number of wavelengths according to setting information is 1, and the number of wavelengths according to switch restriction is 0. At the input of the node 4(#5), the number of wavelengths according to setting information is 1, and the number of wavelengths according to switch restriction is 0. At the output of the node 4(#5), the number of wavelengths according to setting information is 2, and the number of wavelengths according to switch restriction is 1. At the input of the node 4(#6), the number of wavelengths according to setting information is 2, and the number of wavelengths according to switch restriction is 1. At the output of the node 4(#6), the number of wavelengths according to setting information is 1, and the number of wavelengths according to switch restriction is 0.

In the case of starting the system shown in FIG. 3, the optical switch 10 in each node 4 is fixed to the off-state as mentioned above to determine the number of wavelengths of the signal light input to the preamplifier 6 and to make ALC stable in this condition. For example, in the node 4(#2), ALC in the preamplifier 6 is not stable and the optical switch 10 is therefore fixed to the off-state. As a result, only the optical signals of two wavelengths added to the node 4(#2) are input to the postamplifier 14 in the node 4(#2). In this case, only the optical signals of two wavelengths are input to the preamplifier 6 in the node 4(#3) immediately downstream of the node 4(#2) as is the case with the postamplifier 14 in the node 4(#2).

Accordingly, in the node 4(#3), the number of wavelengths of the signal light input to the preamplifier 6 is determined. Then, the total output power from the preamplifier 6 in the node 4(#3) is set according to the above-determined number of wavelengths, and ALC is started. When the ALC in the preamplifier 6 is converged, the optical switch 10 in the node 4(#3) is changed from the off-state into the on-state.

According to this preferred embodiment as described above, the optical switch in each node is restricted only by the condition of the preamplifier of the next node regardless of the conditions of the other nodes, thereby realizing the start with ALC while maintaining the closed loop topology.

Figure 4:
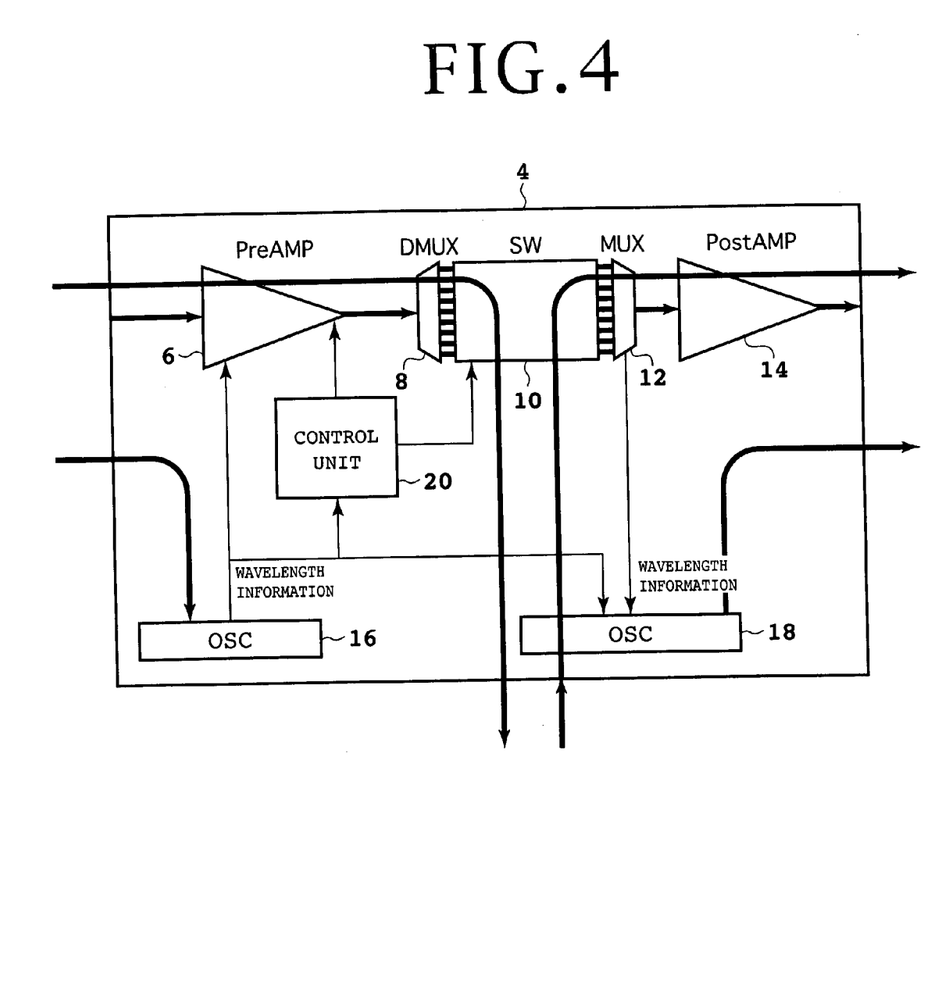
FIG. 4 is a block diagram showing the configuration of each node shown in FIG. 3.

FIG. 4 is a block diagram of each node 4 in the system shown in FIG. 3. The node 4 has an optical supervisory circuit (OSC) 16 for obtaining supervisory information according to a signal (e.g., optical signal) from the node 4 immediately upstream of this node 4. The supervisory information includes wavelength information (information on the number of wavelengths) of WDM signal light transmitted from the immediately upstream node 4 to this node 4. The wavelength information from the optical supervisory circuit 16 is supplied to the preamplifier 6, another optical supervisory circuit 18, and a control unit 20. In the preamplifier 6, a target value of the total optical output power in ALC is set according to the wavelength information supplied.

The control unit 20 controls the preamplifier 6 and/or the optical switch 10 so that the optical signals other than one or more optical signals added to this node 4 are not output from this node 4 until ALC in the preamplifier 6 is converged.

The optical supervisory circuit 18 generates new wavelength information in this node 4 according to the wavelength information from the optical supervisory circuit 16 and the wavelength information from the optical switch 10 or the optical multiplexer 12, and then transmits supervisory information including this newly generated wavelength information to the next node 4 immediately downstream of this node 4.

Figure 5:
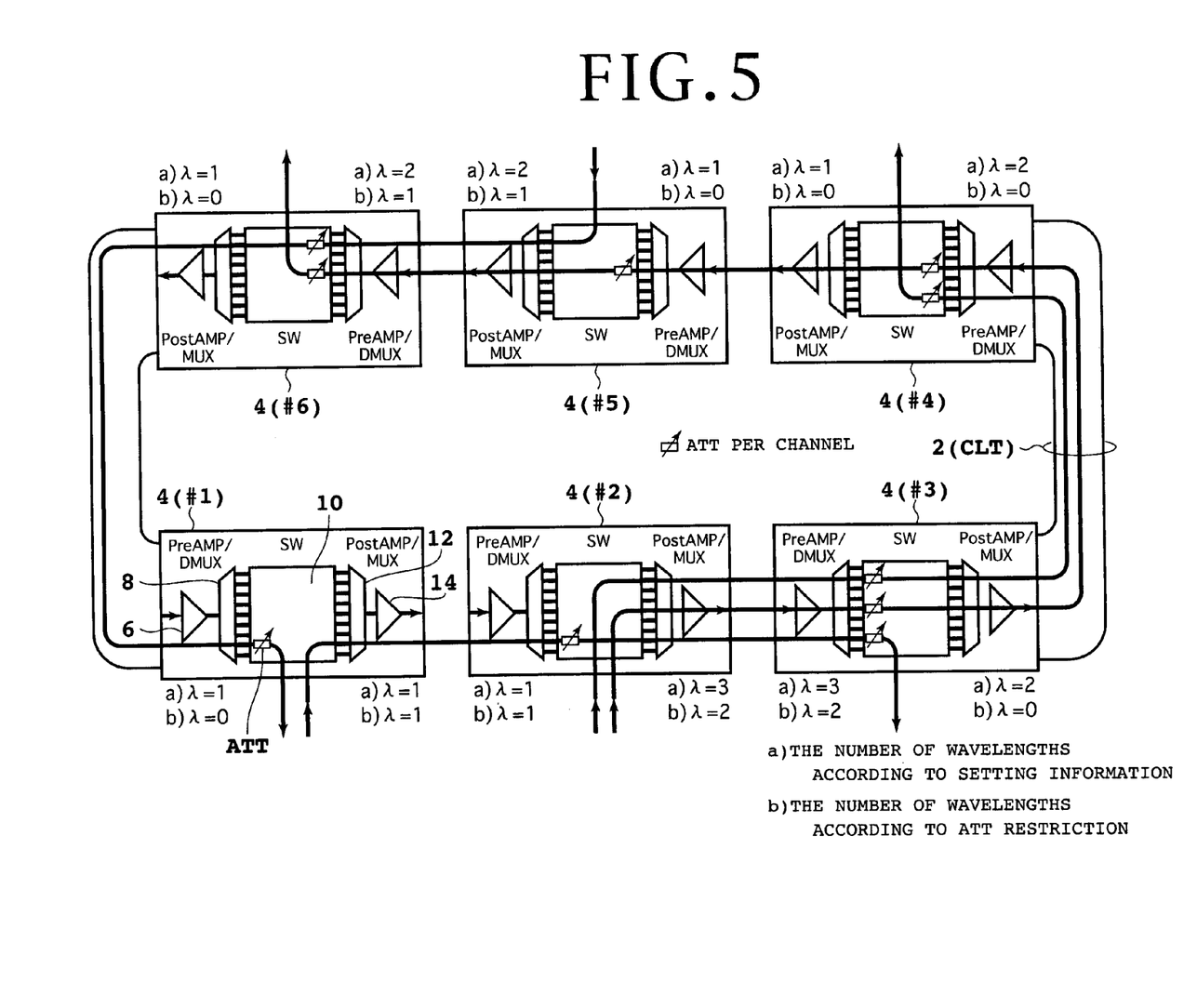
FIG. 5 is a block diagram showing a second preferred embodiment of the system according to the present invention.

FIG. 5 is a block diagram showing a second preferred embodiment of the system according to the present invention. In the system shown in FIG. 3, each node 4 uses the switch function of the optical switch 10 to cut off the specific optical signals until ALC in each node 4 is converged. In contrast thereto, the optical switch 10 in each node 4 shown in FIG. 5 additionally includes at least one optical attenuator (ATT), and the attenuation of the optical attenuator is maximized to thereby cut off the specific optical signals until ALC in each node 4 is converged.

In general, a transmission device adopting WDM employs an optical attenuator for changing the attenuation of optical power of each optical signal to compensate for a level difference between the optical signals. While the optical attenuator is provided in the optical switch 10 in this preferred embodiment, the optical attenuator may be provided between the optical demultiplexer 8 and the optical switch 10 or between the optical switch 10 and the optical multiplexer 12.

According to this preferred embodiment, the optical attenuator for compensating for a level difference between the optical signals of WDM signal light is used also for the purpose of carrying out the present invention. Accordingly, the configuration of each node can be simplified. Furthermore, as compared with the preferred embodiment shown in FIG. 3, the optical switch 10 in each node 4 can be controlled more simply.

According to the preferred embodiments shown in FIGS. 3 and 5, the optical signals other than one or more optical signals added to each node 4 are cut off so as not to be output from the node 4 until ALC in the node 4 is converged (for example, until a predetermined time period elapses from the time of starting ALC).

In contrast, the following preferred embodiment is characterized in that ALC in each node 4 is stopped when the number of wavelength channels of WDM signal light input is changed and that ALC is restarted after different time periods in all the nodes 4 have elapsed from the time of stopping ALC. This will now be described more specifically.

Figure 6:
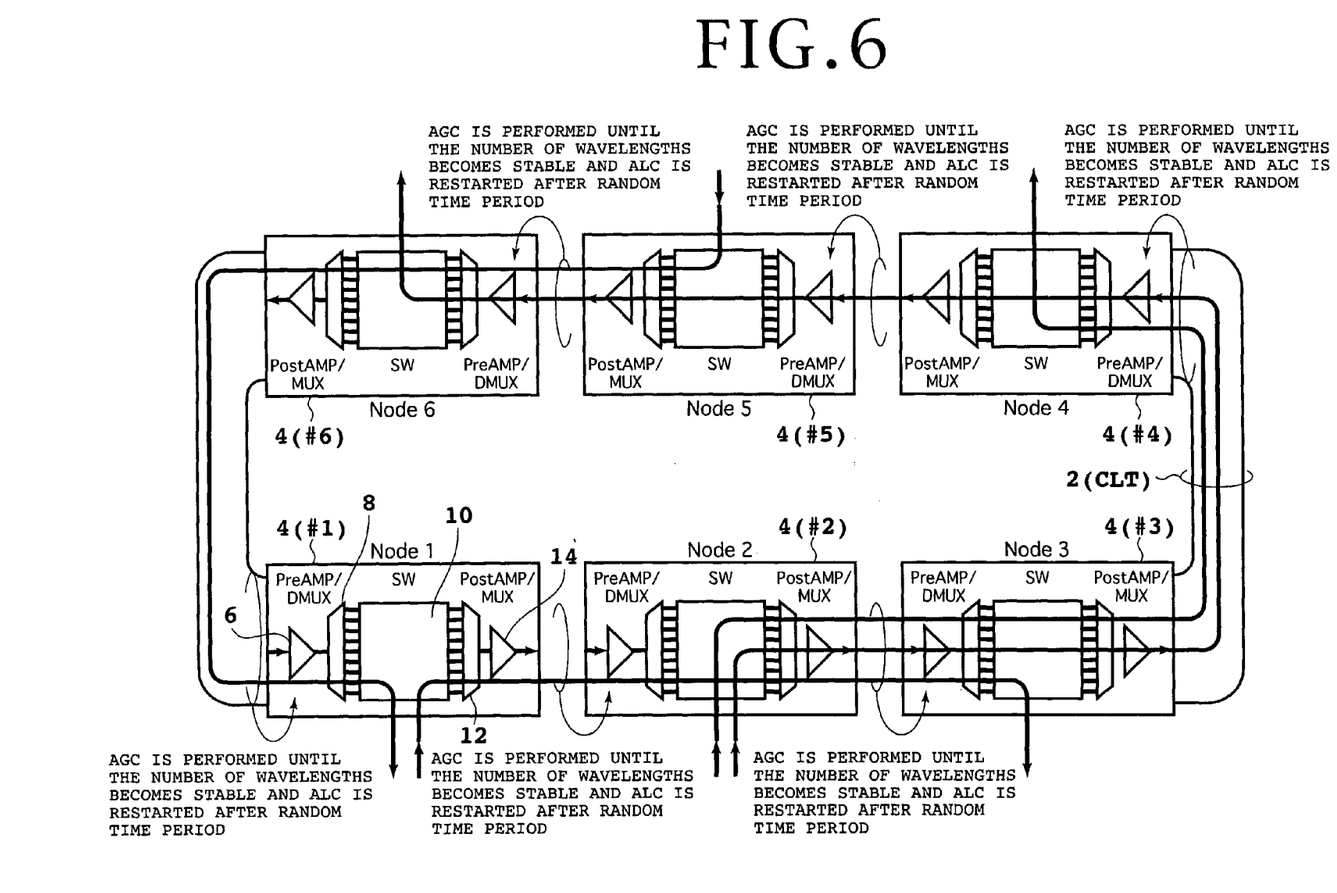
FIG. 6 is a block diagram showing a third preferred embodiment of the system according to the present invention.
Figure 7:
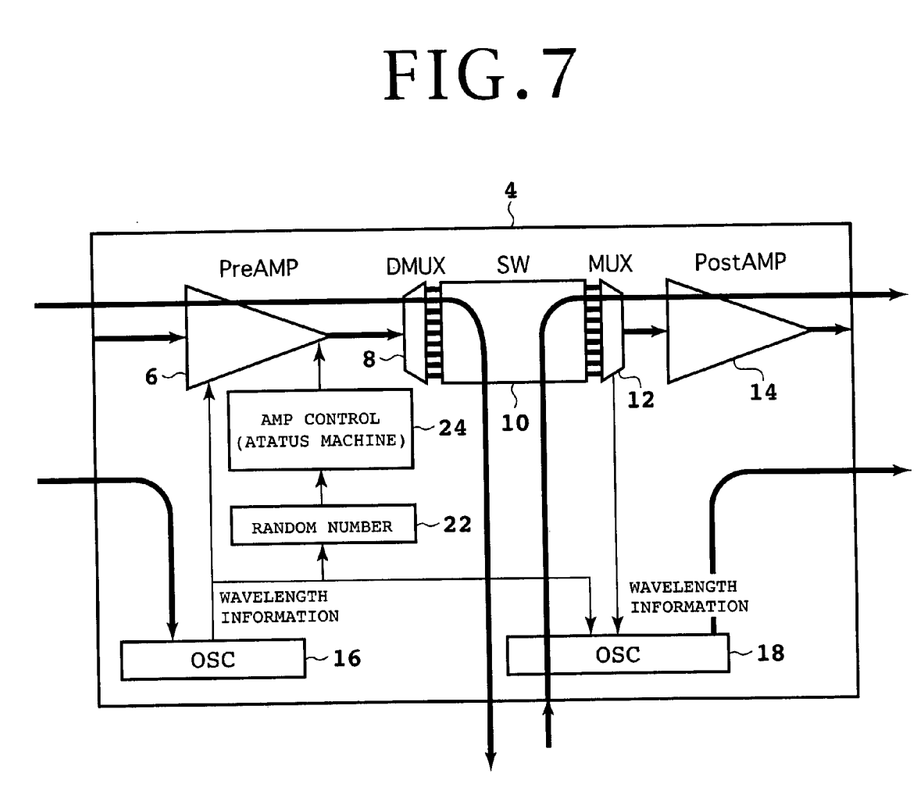
FIG. 7 is a block diagram showing the configuration of each node shown in FIG. 6.

FIG. 6 is a block diagram showing a third preferred embodiment of the system according to the present invention, and FIG. 7 is a block diagram showing the configuration of each node 4 shown in FIG. 6. In contrast to the preferred embodiment shown in FIG. 4, the preferred embodiment shown in FIG. 7 is characterized in that each node 4 has a random number generator 22 and a status machine 24 in place of the control unit 20 (see FIG. 4).

The random number generator 22 generates random number data for calculation of a random time period from the time when the number of wavelengths of WDM signal light input to the node 4 is changed, according to the wavelength information from the optical supervisory circuit 16. The status machine 24 stops ALC in the preamplifier 6 simultaneously with the above change in the number of wavelengths and restarts ALC after the time period calculated according to the random number data supplied from the random number generator 22 has elapsed.

For example, the status machine 24 switches so that AGC is performed in the preamplifier 6 when ALC in the preamplifier 6 is stopped. In this case, AGC may be performed in such a manner that the input level and the output level of the preamplifier 6 are detected and the pumping condition or the like is controlled so that the ratio of the input level and the output level detected above becomes constant. Further, ALC may be performed in such a manner that the output level of the preamplifier 6 is detected and the pumping condition or the like is controlled so that the output level detected above becomes constant.

In the case of initially starting the system shown in FIG. 6, each node 4 starts control independently so as to start ALC in the preamplifier 6. The optical output from each node 4 is unstable until ALC becomes stable, so that the wavelength information is zero. Accordingly, the preamplifier 6 performs ALC according to the number of wavelengths of the optical signals added to the node 4.

However, when the preamplifier 6 in a certain one of the nodes 4 (e.g., the node 4(#2)) completes the start of ALC, the number of wavelengths of the optical signals input to the postamplifier 14 is changed because the node 4(#2) has through setting for the input optical signals. As a result, the number of wavelengths of the optical signals input to the preamplifier 6 in the next node (the node 4(#3) in this case) immediately downstream of the node 4(#2) is changed. It is necessary to determine the number of wavelengths of input signal light in performing ALC in the preamplifier 6. Therefore, if ALC is started in the node 4(#3) regardless of the change in the number of wavelengths of the input signal light, the optical output level from the node 4(#3) becomes erroneous.

In this preferred embodiment, ALC in the preamplifier 6 is temporarily switched to AGC when the number of wavelengths is changed, and ALC is then newly started again. However, if this switching and restarting of ALC are performed simultaneously in the plural nodes 4, there may arise a problem such that ALC cannot be converged permanently. To prevent that the restarting of ALC is performed simultaneously in the plural nodes 4, this preferred embodiment has solved the above problem by performing the restarting of ALC after different time periods have elapsed in the plural nodes 4 from the time of stopping ALC.

Accordingly, the initial start of each node in the closed loop topology can be stably performed to thereby attain the object of the present invention.

Figure 8:
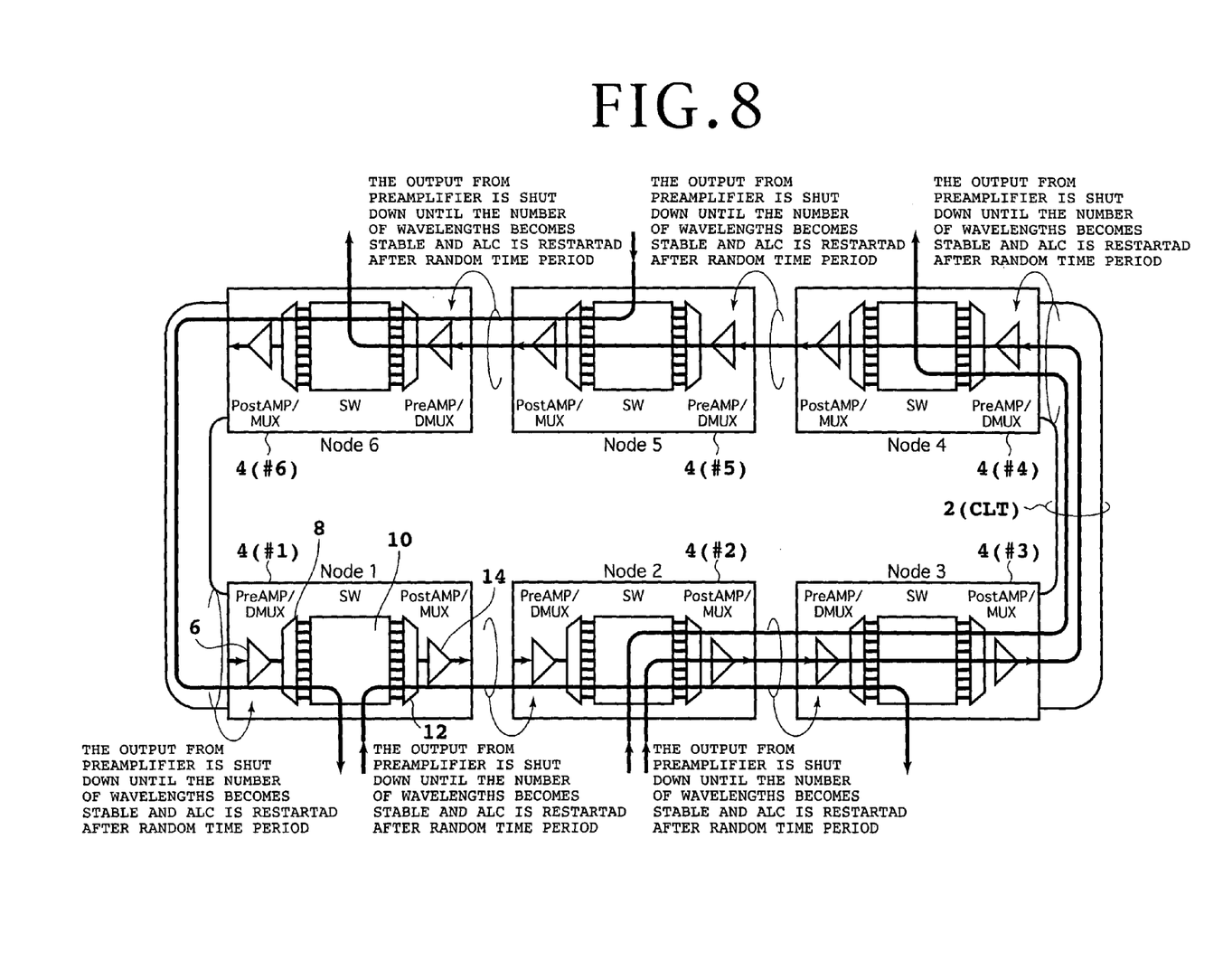
FIG. 8 is a block diagram showing a fourth preferred embodiment of the system according to the present invention.

FIG. 8 is a block diagram showing a fourth preferred embodiment of the system according to the present invention. In the preferred embodiment shown in FIG. 6, the setting of the control form of the preamplifier 6 is temporarily changed from ALC to AGC when the number of wavelengths of signal light input to the preamplifier 6 is changed. In contrast thereto, this preferred embodiment is characterized in that the preamplifier 6 is controlled so that the output itself from the preamplifier 6 is shut down when the number of wavelengths of signal light input to the preamplifier 6 is changed.

Also according to such control, the initial start of each node in the closed loop topology can be stably performed to thereby attain the object of the present invention.

Figure 9:
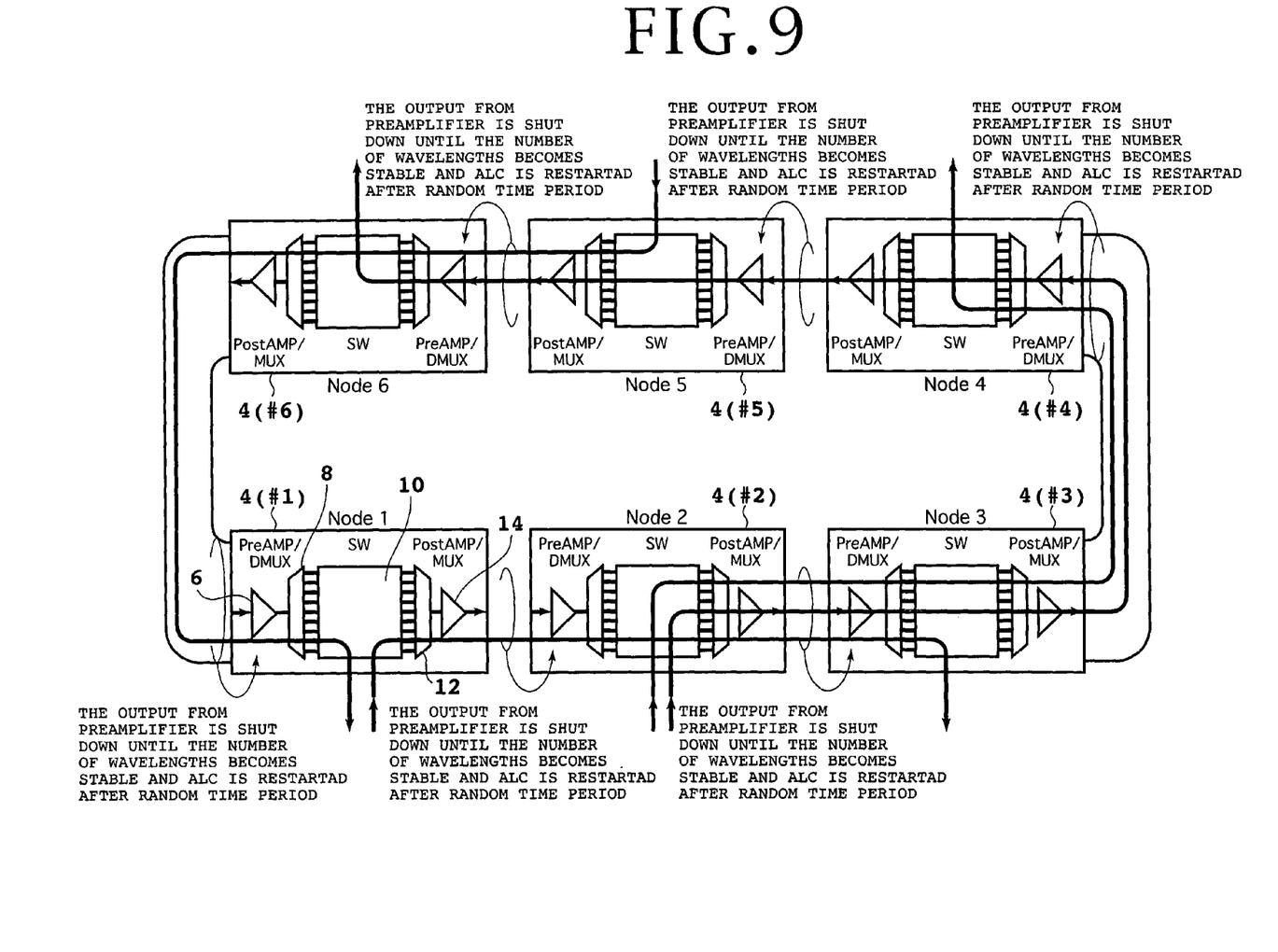
FIG. 9 is a block diagram showing a fifth preferred embodiment of the system according to the present invention.
Figure 10:
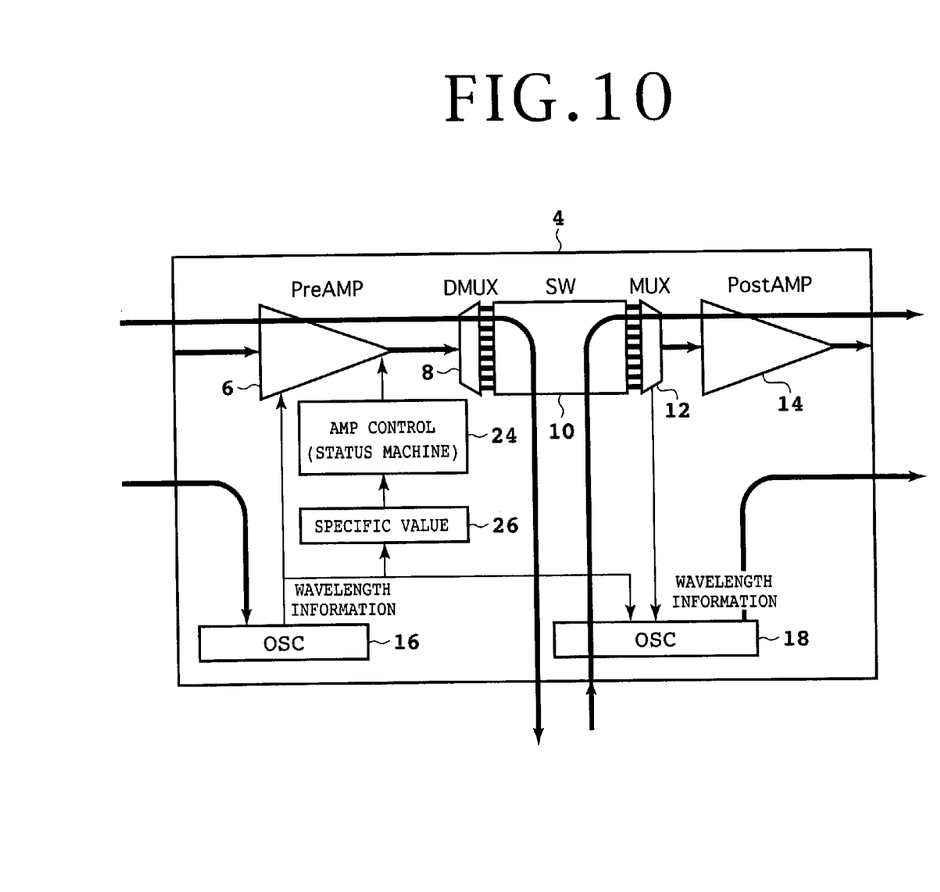
FIG. 10 is a block diagram showing the configuration of each node shown in FIG. 9.

FIG. 9 is a block diagram showing a fifth preferred embodiment of the system according to the present invention, and FIG. 10 is a block diagram showing the configuration of each node 4 shown in FIG. 9.

In the preferred embodiment shown in FIGS. 6 and 7, the elapsed time periods different in the plural nodes 4 from the time of stopping ALC in the preamplifier 6 in each node 4 are obtained according to the random number data generated in the random number generator 22, and after the elapsed time periods the ALC is restarted.

In contrast thereto, the preferred embodiment shown in FIGS. 9 and 10 employs a specific value generator 26 in place of the random number generator 22 to configure a control unit for the purpose of restarting ALC after the elapse of different time periods in the plural nodes 4.

The specific value generator 26 in each node 4 generates specific value data for calculation of a time period specific in this node 4 from the time when the number of wavelengths of WDM signal light input to this node 4 is changed, according to the wavelength information from the optical supervisory circuit 16. The status machine 24 stops ALC in the preamplifier 6 simultaneously with the above change in the number of wavelengths, and restarts ALC after the time period calculated according to the specific value data supplied from the specific value generator 26 has elapsed. For example, the status machine 24 switches so that the output from the preamplifier 6 is shut down when ALC in the preamplifier 6 is stopped.

In the case of initially starting the system shown in FIG. 9, each node 4 starts control independently so as to start ALC in the preamplifier 6. The optical output from each node 4 is unstable until ALC becomes stable, so that the wavelength information is zero. Accordingly, the preamplifier 6 performs ALC according to the number of wavelengths of the optical signals added to the node 4.

However, when the preamplifier 6 in a certain one of the nodes 4 (e.g., the node 4(#2)) completes the start of ALC, the number of wavelengths of the optical signals input to the postamplifier 14 is changed because the node 4(#2) has through setting for the input optical signals. As a result, the number of wavelengths of the optical signals input to the preamplifier 6 in the next node (the node 4(#3) in this case) immediately downstream of the node 4(#2) is changed. It is necessary to determine the number of wavelengths of input signal light in performing ALC in the preamplifier 6. Therefore, if ALC is started in the node 4(#3) regardless of the change in the number of wavelengths of the input signal light, the optical output level from the node 4(#3) becomes erroneous.

In this preferred embodiment, ALC in the preamplifier 6 is temporarily switched to a suspended condition when the number of wavelengths is changed, and ALC is then newly started again. However, if this switching and restarting of ALC are performed simultaneously in the plural nodes 4, there may arise a problem such that ALC cannot be converged permanently. To prevent that the restarting of ALC is performed simultaneously in the plural nodes 4, this preferred embodiment has solved the above problem by performing the restarting of ALC after different time periods have elapsed in the plural nodes 4 from the time of stopping ALC.

Accordingly, the initial start of each node in the closed loop topology can be stably performed to thereby attain the object of the present invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A system comprising:
    a closed loop topology adapted to WDM signal light obtained by wavelength division multiplexing a plurality of optical signals; and
    a plurality of nodes arranged along said closed loop topology;
    each of said nodes comprising:
        a first optical amplifier for amplifying input signal light;
        an optical demultiplexer for separating signal light output from said first optical amplifier into a plurality of optical signals;
        an optical switch adapted to operate on a plurality of optical signals output from said optical demultiplexer;
        an optical multiplexer for wavelength division multiplexing a plurality of optical signals output from said optical switch;
        a second optical amplifier for amplifying signal light output from said optical multiplexer; and
        a control unit for controlling said first and second optical amplifiers;
    said control unit comprising:
        first means for transmitting the number of channels of WDM signal light to be output from a corresponding node to a node immediately downstream of the corresponding node;
        second means for controlling said first optical amplifier so that an output from said first optical amplifier becomes constant, according to the number of channels of WDM signal light received from the node immediately upstream of the corresponding node; and
        third means for controlling said optical switch so that the optical signals other than one or more optical signals added to the corresponding node are not output from the corresponding node until the control by said second means is converged.

2. A system according to claim 1, wherein said third means comprises means for switching paths in said optical switch.

3. A system according to claim 1, wherein said third means comprises means for attenuating the optical signals passing through said optical switch.

4. A system comprising:
    a closed loop topology adapted to WDM signal light obtained by wavelength division multiplexing a plurality of optical signals; and
    a plurality of nodes arranged along said closed loop topology;
    each of said nodes comprising:
        a first optical amplifier for amplifying input signal light;
        an optical demultiplexer for separating signal light output from said first optical amplifier into a plurality of optical signals;
        an optical switch adapted to operate on a plurality of optical signals output from said optical demultiplexer;
        an optical multiplexer for wavelength division multiplexing a plurality of optical signals output from said optical switch;
        a second optical amplifier for amplifying signal light output from said optical multiplexer; and
        a control unit for controlling said first and second optical amplifiers;
    said control unit comprising:
        first means for transmitting the number of channels of WDM signal light to be output from a corresponding node to a node immediately downstream of the corresponding node;
        second means for controlling said first optical amplifier so that an output from said first optical amplifier becomes constant, according to the number of channels of WDM signal light received from the node immediately upstream of the corresponding node;
        third means for stopping the control by said second means when the number of channels received is changed; and fourth means for restarting the control by said second means after different time periods in said plurality of nodes have elapsed from the time of stopping by said third means.

5. A system according to claim 4, wherein said third means comprises means for interrupting the output from said first optical amplifier.

6. A system according to claim 4, wherein said third means comprises means for switching the control of said first optical amplifier to automatic gain control.

7. A system according to claim 4, wherein said fourth means comprises a random number generator for obtaining said different time periods.

8. A system according to claim 4, wherein said fourth means comprises a specific value generator for obtaining said different time periods.

9. A system according to claim 8, wherein said specific value generator stores different values in said plurality of nodes.

10. A method comprising the steps of:
providing a closed loop topology using an optical fiber applicable to WDM signal light obtained by wavelength division multiplexing a plurality of optical signals;
providing a plurality of nodes each including an optical amplifier along said closed loop topology; and
controlling each of said nodes;
said controlling step comprising:
a first step of controlling said optical amplifier so that an output level from said optical amplifier becomes a constant level, according to a number of channels of the WDM signal light received from a node immediately upstream of a corresponding node; and
a second step of interrupting the optical signals other than one or more optical signals added to the corresponding node until the output level from said optical amplifier is converged to said constant level by said first step of controlling.

11. A method according to claim 10, wherein said second step comprises the step of providing an optical switch adapted to operate on said plurality of optical signals.

12. A method according to claim 10, wherein said second step comprises the step of providing a plurality of attenuators for respectively attenuating said plurality of optical signals.

13. A system comprising:
a closed loop topology using an optical fiber applicable to WDM signal light obtained by wavelength division multiplexing a plurality of optical signals; and
a plurality of nodes arranged along said closed loop topology, each of said nodes including an optical amplifier;
each of said nodes comprising:
first means for controlling said optical amplifier so that an output level from said optical amplifier becomes a constant level, according to a number of channels of the WDM signal light received from a node immediately upstream of a corresponding node; and
second means for interrupting the optical signals other than one or more optical signals added to the corresponding node until the output level from said optical amplifier is converged to said constant level by said first means.

14. A system according to claim 13, wherein said second means comprises an optical switch adapted to operate on said plurality of optical signals.

15. A system according to claim 13, wherein said second means comprises a plurality of attenuators for respectively attenuating said plurality of optical signals.

16. A method comprising the steps of:
providing a closed loop topology using an optical fiber applicable to WDM signal light obtained by wavelength division multiplexing a plurality of optical signals;
providing a plurality of nodes each including an optical amplifier along said closed loop topology; and
controlling each of said nodes
said controlling step comprising:
a first step of controlling said optical amplifier so that an output from said optical amplifier becomes constant, according to the number of channels of WDM signal light received from a node immediately upstream of a corresponding node;
a second step of stopping the control by said first step when the number of channels received is changed; and
a third step of restarting the control by said first step after different time periods in said plurality of nodes have elapsed from the time of stopping by said second step.

17. A method according to claim 16, wherein said second step comprises the step of interrupting the output from said optical amplifier.

18. A method according to claim 16, wherein said second step comprises the step of switching the control of said optical amplifier to automatic gain control.

19. A method according to claim 16, wherein said third step comprises the step of providing a random number generator for obtaining said different time periods.

20. A method according to claim 16, wherein said third step comprises the step of providing a specific value generator for obtaining said different time periods.

21. A method according to claim 20, wherein said specific value generator stores different values in said plurality of nodes.

22. A system comprising:
a closed loop topology using an optical fiber applicable to WDM signal light obtained by wavelength division multiplexing a plurality of optical signals; and
a plurality of nodes arranged along said closed loop topology, each of said nodes including an optical amplifier;
each of said nodes comprising:
first means for controlling said optical amplifier so that an output from said optical amplifier becomes constant, according to the number of channels of WDM signal light received from a node immediately upstream of a corresponding node;
second means for stopping the control by said first means when the number of channels received is changed; and
third means for restarting the control by said first means after different time periods in said plurality of nodes have elapsed from the time of stopping by said second means.

23. A system according to claim 22, wherein said second means comprises means for interrupting the output from said optical amplifier.

24. A system according to claim 22, wherein said second means comprises means for switching the control of said optical amplifier to automatic gain control.

25. A system according to claim 22, wherein said third means comprises a random number generator for obtaining said different time periods.

26. A system according to claim 22, wherein said third means comprises a specific value generator for obtaining said different time periods.

27. A system according to claim 26, wherein said specific value generator stores different values in said plurality of nodes.

28. An optical transmission system comprising a transmission line and a plurality of nodes arranged along said transmission line for adding and dropping one or more optical signals of WDM signal light;
   each of said nodes having an optical amplifier;
      said optical amplifier being controlled so that an output from said optical amplifier becomes constant, according to the number of channels of WDM signal light received from a node immediately upstream of a corresponding node;
      the optical signals received from said immediately upstream node being not output to the node immediately downstream of the corresponding node until the output from said optical amplifier is converged to a constant level.

29. An optical transmission system comprising a transmission line and a plurality of nodes arranged along said transmission line for adding and dropping one or more optical signals of WDM signal light;
   each of said nodes having an optical amplifier;
   said optical amplifier being controlled so that an output from said optical amplifier becomes constant, according to the number of channels of WDM signal light received from a node immediately upstream of a corresponding node;
   the control of said optical amplifier being stopped when the number of channels of WDM signal light received is changed;
   the control of said optical amplifier being restarted after a predetermined time period has elapsed from the time of stopping the control of said optical amplifier.

30. An optical transmission system for adding and dropping one or more optical signals of WDM signal light, said optical transmission system being connected to an optical transmission line;
   said optical transmission system comprising:
   a first optical amplifier for amplifying light from said optical transmission line;
   an optical demultiplexer for separating an output from said first optical amplifier into a plurality of optical signals having different wavelengths;
   an optical switch for inputting said optical signals from said optical demultiplexer and said one or more optical signals added to switch among through, add, and drop paths;
   a second optical amplifier for amplifying an output from said optical switch; and
   a control unit for controlling said first optical amplifier so that an output from said first optical amplifier becomes constant, according to the number of channels of WDM signal light transmitted by said optical transmission line, and interrupting said input optical signals other than said one or more optical signals added until the output from said first optical amplifier is converged to a constant level.

31. An optical transmission system for adding and dropping one or more optical signals of WDM signal light, said optical transmission system being connected to an optical transmission line;
   said optical transmission system comprising:
   a first optical amplifier for amplifying light from said optical transmission line;
   an optical demultiplexer for separating an output from said first optical amplifier into a plurality of optical signals having different wavelengths;
   an optical switch for inputting said optical signals from said optical demultiplexer and said one or more optical signals added to switch among through, add, and drop paths;
   a second optical amplifier for amplifying an output from said optical switch; and
   a control unit for controlling said first optical amplifier so that the output from said first optical amplifier becomes constant, according to the number of channels of WOM signal light transmitted by said optical transmission line, stopping the control of said first optical amplifier when the number of channels of WDM signal light transmitted by said optical transmission line is changed, and restarting the control of said first optical amplifier after a predetermined time period has elapsed from the time of stopping the control of said first optical amplifier.

* * * * *

UNITED STATES PATENT AND TRADEMARK OFFICE
CERTIFICATE OF CORRECTION

| | |
|---|---|
| PATENT NO. | : 7,224,899 B2 |
| APPLICATION NO. | : 10/614791 |
| DATED | : May 29, 2007 |
| INVENTOR(S) | : Kiyotoshi Noheji |

It is certified that error appears in the above-identified patent and that said Letters Patent is hereby corrected as shown below:

Column 14, Line 11, change "nodes" to --nodes;--.

Column 16, Line 37, change "WOM" to --WDM--.

Signed and Sealed this

Sixth Day of November, 2007

JON W. DUDAS
*Director of the United States Patent and Trademark Office*